United States Patent [19]

Paul, Jr.

[11] Patent Number: 4,911,407
[45] Date of Patent: Mar. 27, 1990

[54] VALVE SEAT STRUCTURE AND ASSEMBLY

[76] Inventor: Herman L. Paul, Jr., 370 Dogwood La., R.D. 5, Lebanon, Pa. 17042

[21] Appl. No.: 324,826

[22] Filed: Mar. 17, 1989

[51] Int. Cl.$^4$ ................................................. F16K 3/20
[52] U.S. Cl. .................................... 251/172; 251/193; 251/328
[58] Field of Search ............... 251/159, 172, 175, 193, 251/195, 203, 327, 328, 359

[56] References Cited

U.S. PATENT DOCUMENTS

| 1,756,615 | 4/1930 | Wolff | 251/328 |
| 1,874,405 | 8/1932 | Ward | 251/328 |
| 2,726,843 | 12/1955 | Evans et al. | |
| 3,504,886 | 4/1970 | Hulslander et al. | |
| 4,124,194 | 11/1978 | Alvarez et al. | |
| 4,208,035 | 6/1980 | Alvarez et al. | 251/328 X |
| 4,568,062 | 2/1986 | Regitz et al. | |

FOREIGN PATENT DOCUMENTS

| 1907648 | 8/1970 | Fed. Rep. of Germany | 251/172 |
| 1252921 | 11/1971 | United Kingdom | 251/172 |

Primary Examiner—John Fox
Attorney, Agent, or Firm—Samuel M. Learned, Jr.

[57] ABSTRACT

A valve seat structure and assembly for a gate, ball, globe or plug type valve adapted to enhance the high-pressure seat sealing capabilities thereof, comprised in alternate embodiments of either a single or a cooperative set of rings having either an interior or exterior geometrically configured circumferentially recessive undercut channel to provide an overhang flex-lip structure against which the closed valve plug compressively seats in flex communicative seal on one side thereof and pressurized line fluid exerts a uniformly distributed circumferential counter flexure deflective force on the other side thereof, wherein the preferred embodiment overhang flex-lip structure is provided with a radially spaced plurality of flex-limit stop posts within the undercut channel thereof whereby valve plug compressive deflection of the flex-lip is restricted to less than that amount which would exceed the permanent distortion flex limit of a particular material from which the valve seat rings are constructed.

6 Claims, 5 Drawing Sheets

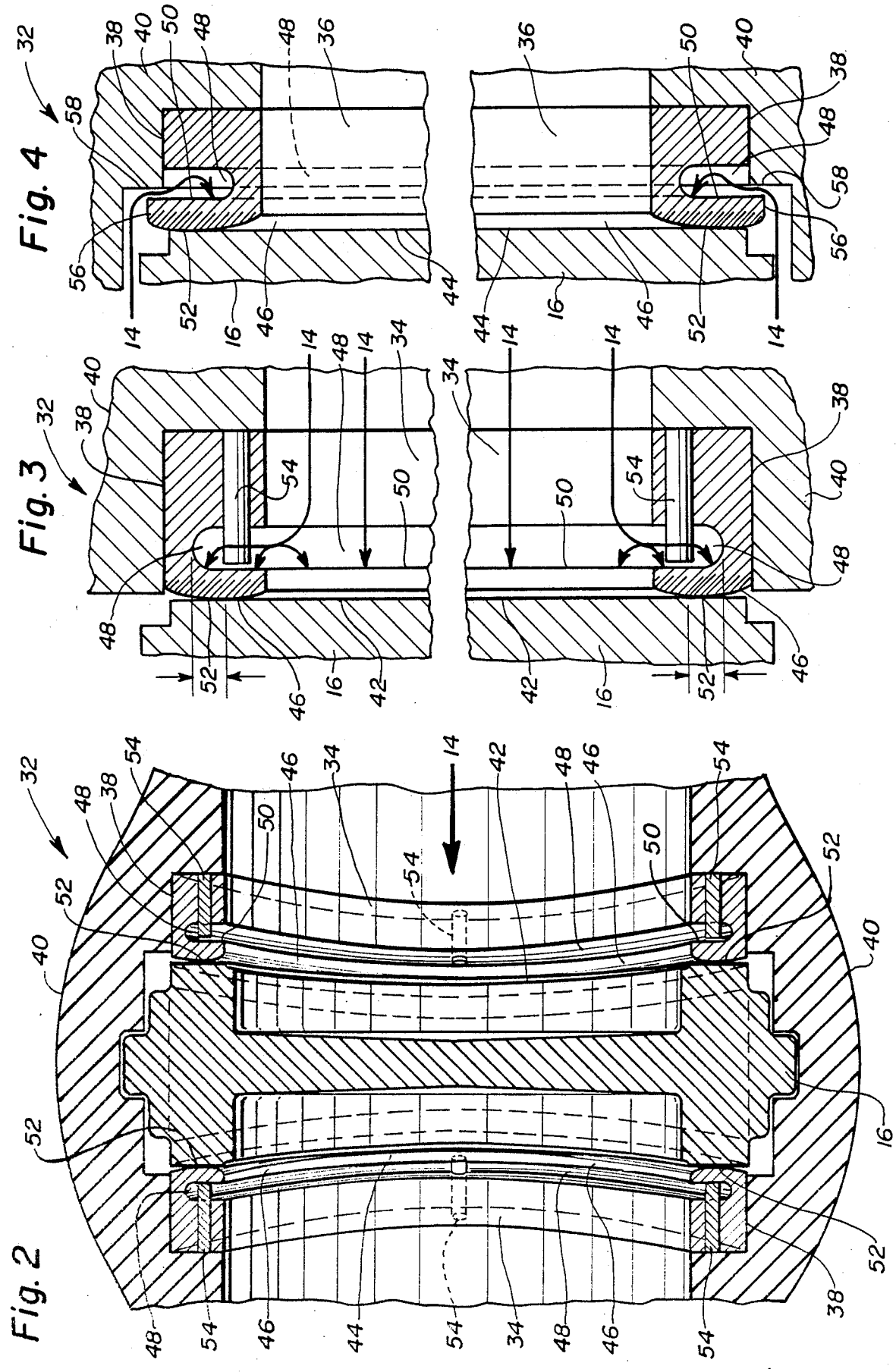

VALVE SEAT STRUCTURE AND ASSEMBLY

BACKGROUND OF THE INVENTION

The instant invention relates to a valve seat structure and assembly adapted for high-pressure applications in gate, ball, globe or plug type valves wherein the assembly in either the preferred or alternate embodiment versions may be utilized as original or retrofit and replacement seats.

Typically, seats for the various types valves mentioned above are made from various pliable and resiliently deformable materials such as rubber and plastics. When one gets into very high-pressure applications, however, such as with reactor vessels where pressures can be on the order of 3,000 psi, and frequently in combination with high-temperature and corrosive or hazardous material environments, the rubber and plastic valve seat seals are both inadequate and unsuitable from the standpoint of both reliability and maintenance.

In an effort to overcome the inherent reliability and maintenance problems in high-pressure applications as described above, valve seats were machined from metal alloy material with some sort of flex-lip structure to enable a close tolerance flex-compressive fit with the screwed down valve plug component, being fabricated from an appropriated metal alloy chosen to more satisfactorily withstand both the pressure and operational environment conditions to which the valve seat would be subjected. Examples of metal valve seats of the type above-described would be as respectively taught in U.S. Pat. No. 2,726,843 to Evans et al dated Dec. 13, 1955; U.S. Pat. No. 3,504,886 to Hulslander et al dated Apr. 7, 1970; U.S. Pat. No. 4,124,194 to Alvarez et al dated Nov. 7, 1978; and U.S. Pat. No. 4,568,062 to Regitz et al dated Feb. 4, 1986.

In the case of metal valve seats, effective seals between the valve plug face contact surface and the seat contact surface is accomplished by providing machined close-tolerance contact surface fits therebetween, and in operation compressively engaging the valve plug face contact surface against the seat flex-lip contact surface with a sufficient force to cause flex-compressive fit thereby generally providing a leak-tight seal.

Although the metal valve seat with close tolerance to valve plug face flex compressive fit is a reliable and effective means to solve the high-pressure and harsh operational environment valve seal problem, there is the hazard of exerting excessive force on the valve seat flex-lip and thereby deflect the metal alloy material thereof beyond its permanent distortion limit and "spring" the valve seat flex-lip so that it no longer is mechanically capable of providing either a close tolerance or flex-compressive fit.

The valve seat structure and assembly taught by applicant herein provides a new and novel means to overcome the above problem while at the same time effecting a metal valve seat sealing under high-pressure and harsh operational conditions by embodying a system of flex-lip stops which prevent distortion of the flex-lip beyond the permanent distortion limit thereof during valve plug face flex-compressive fit sealing therewith while at the same time utilizing a back-pressure effect of the contained fluid to produce a counter force across the flex-lip to more closely conform the close tolerance fits of valve plug face and valve seal face in establishing and maintaining a leak-tight seal.

SUMMARY OF THE INVENTION

It is the principal object of the present invention to provide a valve seat structure and assembly, adapted in both the preferred and alternate embodiment versions and combinations thereof, to enhance the high-pressure seat sealing capabilities of gate, ball, globe or plug type valves and virtually eliminate leakage problems otherwise associated therewith in not only a high-pressure, but also a combined high-heat, corrosive and hazardous material handling environment.

It is another object of the present invention to provide a valve seat structure and assembly which operates on the cooperative seat sealing effects of valve plug compression against a deflective seat seal flex-lip in combination with opposing fluid line back-pressure exerting a counter flexure deflective force on the opposite flex-lip side.

It is also an object of the present invention to provide a mechanically superior valve seat structure and assembly constructed from various metals and metal alloy materials best suited for the particular use enviroment in terms of high-pressure, temperature and corrosive and hazardous material handling conditions.

It is likewise an object of the present invention to provide a valve seat structure and assembly wherein the deflective seat seal flex-lip is backed with a radially spaced plurality of flex-limit stop posts whereby valve plug compressive deflection of the flex-lip is restricted to less than that amount which would exceed the permanent distortion flex limit of a particular material from which the valve seat is constructed.

Still another object of the present invention is to provide a valve seat structure and assembly which is relatively simple, and likewise relatively easy to install and maintain.

Yet another object of the present invention is to provide a valve seat structure and assembly adapted for use in either an original or retrofit valve seat installation.

The foregoing, and other objects hereof, will be readily evident upon a study of the following specification and accompanying drawings comprising a part thereof.

BRIEF DESCRIPTION OF THE DRAWINGS

FIG. 2 is an enlarged horizontal section through the gate plug and valve seat structure and installed assembly as seen along the line 2—2 of FIG. 1.

FIG. 3 is an enlarged foreshortened schematic detail rendition of the preferred embodiment valve seat structure and installed assembly as seen on the pressure (upstream) side of the gate plug.

FIG. 4 is an enlarged foreshortened schematic detail rendition of an alternate embodiment valve seat structure and assembly as seen on the pressure side of the gate plug.

DETAILED DESCRIPTION OF THE INVENTION

Figure 1:
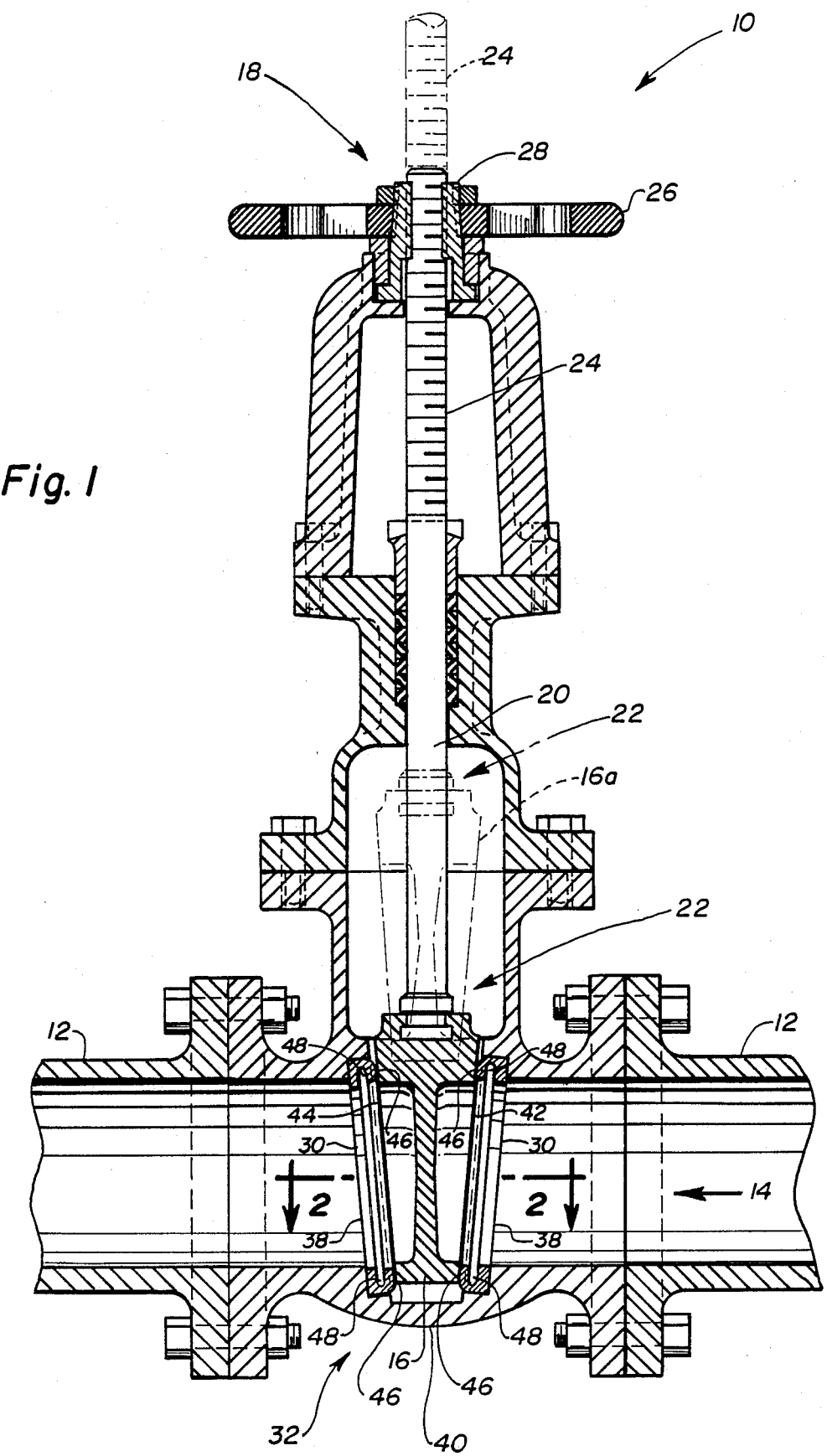
FIG. 1 is a vertical section through a typical gate valve showing the same modified with the valve seat structure and installed assembly of the preferred embodiment of instant invention, wherein the gate plug thereof is shown in solid-line rendition as being closed, and alternately open in phantom line rendition.

Referring to FIG. 1, an overall side sectional elevation view of a typical gate valve 10 is shown operatoinally installed in an exemplary high-pressure fluid transmission line 12 having a direction of fluid flow therein as indicated by the arrow 14, wherein said valve 10 has a valve plug 16 adapted by means of a valve plug opening and closing mechanism 18 comprised of an enlongated shaft 20 connected at one end thereof to said valve plug 16 by means of a pivotal valve plug connection socket assembly 22 and at the other end thereof having a threaded section 24 adapted to elevate and lower said elongated shaft 20 and said valve plug 16 connectably assembled thereto by means of a hand wheel 26 for rotating a threaded bushing 28 through which said threaded section 24 is threadably passed to raise said valve plug 16 to the elevated open position 16a as shown in phantom, or lower said valve plug 16 to the closed position as shown in solid line rendition in a close compressive flex-seal contact thereof with the valve seat rings 30 of the valve seat assembly 32 of instant invention.

Referring again to FIG. 1 to describe and discuss in greater detail the structural and functional features of said valve seat assembly 32 and the valve seat ring 30 elements thereof. Considering first the valve seat rings 30, of which there are two embodiments, being first the internal circular flex-lip valve seat ring as illustrated in FIGS. 2 and 3 and certain other subsequent Figures to be hereinafter described in greater detail, and second the external circular flex-lip valve seat ring 36 as illustrated in FIG. 4 and certain other subsequent Figures likewise to be hereinafter described in greater detail. For purposes of current generalized consideration, however, although the valve seat rings 30 as shown in FIG. 1 are of the internal circular flex-lip configuration, we will discuss at this time only the inherent features of the flex-lip structure rather than particular embodiment profiles per se thereof.

As shown in FIG. 1, the respective valve seat rings 30 are positioned in recesses 38 provided in the valve seat housing 40 of the gate valve 10, and each disposed at an opposite but complementary close tolerance angle to the upstream and downstream faces 42 and 44 respectively of the valve plug 16 so that on a cranked down compressive closing of the valve plug 16 there is established a peripheral mechanically close tolerance physical positioning and contact between the respective valve seat ring 30 circular flex-lip 46 and the valve plug upstream and downstream faces 42 and 44.

Preferably the valve seat rings are fabricated from a suitable metal alloy material capable of withstanding not only the pressure conditions of service, but also the temperature, corrosive, and other environmental circumstances, as well as being suitable for machining operations to provide the circular flex-lip structure and features, namely that of close compressive flex-fit mechanical communication with the corresponding valve plug face 42 or 44 to thereby substantially effect high-pressure leak-proof valve plug 16 to valve seat assembly 32 sealing. It should also be noted, however, a major and innovative novel feature of this invention, as more specifically hereinafter detailed on consideration respectively of FIGS. 3 and 4, is the structural profile of the valve seat rings 30, whether of the internal 34 or external 36 circular flex-lip configuration, to accommodate a flow of pressurized line fluid within the flex-lip recess 48 and thereby provide an opposing reflexive back-pressure counterforce across the circular flex-lip 46 against that of the compressive flex-fit force of the closed valve plug 16. Thus, there are two complementary operative flex-fit forces whereby the facilitated accomplishment of a substantially leak-proof valve plug 16 to valve seat assembly 32 sealing is accomplished, first that of the angularly close tolerance compressive flex-fit mechanical communication of the valve plug face 42 or 44 respectively against the circular flex-lip 46 of the corresponding valve seat ring 30, and secondly the enhancement of that foregoing close compressive fit by the reflexive back-pressure force with the flex-lip recess 48 across the circular flex-lip 46 exerted towards the valve plug face with the result that the higher the line pressure the greater the reflexive back-pressure force plug-to-seat sealing effect.

Considering now the enlarged horizontal section of the valve seat assembly 32 as shown in FIG. 2, which illustrates in greater detail the internal circular flex-lip 34 embodiment version of the valve seat ring. As can be seen the valve plug 16 upstream 42 and downstream 44 faces are engaged in close contact compressive flex-fit mechanical communication with the circular flex-lips 46 of the respective internal circular flex-lip valve seat rings 34 installed within the valve seat housing 40, so that substantially leak-proof sealing therebetween is thus achieved by the valve seat assembly 32. Further, on the upstream pressure side as indicated by the high-pressure fluid flow direction arrow 14, since the flex-lip recess 48 is open to the high-pressure fluid 14 that fluid fills said recess 48 and from the contained line pressure thereof exerts a reflexive hydraulic counterforce against the internal circular flex-lip surface 50 thereby offsetting in some measure, depending upon the static force profile across said circular flex-lip 46 as exerted on the one side by the compressive flex-fit force of the closed valve plug 16 across the face 42 thereof and the opposing high-pressure fluid 14 reflexive hydraulic counterforce exerted by the contained line pressure across the internal circular flex-lip surface 50, part or all of the force differential across said circular flex-lip 46 is neutralized while at the same time effecting a substantially leak-proof seal across the interface contact surface 52 between the valve plug upstream face 42 and the circular flex-lip 46.

Also shown in FIG. 2 are the flex-limit stop posts 54, which on the downstream side serve to supportably engage and limit the deflection of circular flex-lip 46 caused by the compressive flex-fit force exerted by the closed valve plug 16 across the face 44 thereof when there is no opposing high-pressure fluid reflexive hydraulic counterforce effect as a force differential neutralizer across the circular flex-lip 46, thereby to restrict the compressive deflection thereof consequent from valve plug 16 compressive flex-fit force to less than that amount which would exceed the permanent distortion flex limit of the particular material from which the valve seat ring 34 is constructed and thus prevent a "springing" of the flex-lip 46 under the operational circumstances above-described. As will be noted in FIG. 2, the flex-lip 46 of the valve seat ring 34 on the downstream side is "bottomed out" on the flex-limit stop posts 54, while on the upstream side because of the neutralizing force differential effect of the fluid line pressure across said flex-lip 46 there is no "bottoming out" thereof on the flex-limit stop posts 54 as is also shown and perhaps more clearly evident in the FIG. 3 illustration to be considered next.

The view shown in FIG. 3 provides greater detail of the valve seat assembly 32 pressurized fluid side profile relationship between the valve plug upstream face 42 and the circular flex-lip 46, and the high-pressure fluid force factor as indicated by the arrows 14 upon the internal circular flex-lip surface 50, in combination providing the compressive flex-fit communication therebetween whereby a substantially leak-proof valve seat seal is provided across said interface contact surface 52. It will also be more clearly seen, as previously pointed out due to the reflexive hydraulic counterforce effect of high-pressure fluid upon the internal circular flex-lip surface 50 as indicated by the arrows 14, that there is no "bottoming out" of the circular flex-lip upon the flex-limit stop posts 54.

Thus it is seen, when a typical gate valve 10 is equipped either originally or in retrofit with the valve seat assembly 32 of instant invention, whether the valve seat ring is on the upstream pressurized fluid or downstream low pressure fluid side, effective close contact compressive flex-fit mechanical communication to provide a substantially leak-proof seal between the valve plug 16 upstream and downstream faces 42 and 44 respectively and the valve seat assembly 32 circular flex-lips 46 of the valve seat rings 34 across the interface contact surfaces 52 thereof, under high-pressure hazardous environment operational conditions, is provided without substantial danger of mechanical damage to the valve seat assembly 32 on either the high or low pressure side thereof.

Considering now the view shown in FIG. 4, which is an alternate structure for the valve seat ring 30, being the external circular flex-lip valve seat ring 36 embodiment thereof, wherein the flex-lip recess 48 is centrally intermediate about the external periphery of the ring body so that the circular flex-lip 46 faces radially outward and is provided with a lip overhang 56 the function of which is as more fully hereinafter explained.

Although structurally different in profile configuration, and operating as a high-pressure fluid flow downstream valve plug seal, since the high-pressure fluid 14 passes behind the upstream side of the flex-lip recess 48, functionally the external circular flex-lip valve seat ring 36 as shown in FIG. 4 is identical to that of the internal circular flex-lip valve seat ring 34 as shown in FIG. 3, in that the valve plug 16 downstream face 44 engages in compressive flex-fit conformity the circular flex-lip 46 as before to establish and provide a substantially leak-proof interface contact surface 52 therebetween. As will be noted, the high-pressure fluid 14 is sealably retained within the flex-lip recess 48 when the valve plug 16 is compressively closed, therein initially contained by means of the mechanical compressive force factor bearing across the interface contact surface 52 by the valve plug 16 downstream face 44 and the flex-lip 46. Additionally, the high-pressure fluid 14 force vector acting on the internal circular flex-lip surface 50 provides an additional reflexive moment across the interface contact surface 52 likewise as before and also shown to further effect a positive leak-proof valve seat seal. In either forming or cutting the valve seat ring recess 38 for either original or retrofit installation of an external circular flex-lip valve seat ring 36 within the valve seat housing 40, however, a lip overhang support surface 58 is provided whereby the lip overhang 56 may be engaged and stopped from further flexure to thereby prevent a "springing" of the circular flex-lip 46 in the event of a compressive flex-fit overload from the closed valve plug 16 which would otherwise deflect the flex-lip 46 beyond the permanent distortion flex limit thereof.

It should be noted in both FIGS. 3 and 4 as shown in those drawings, finer cross-hatching across the interface contact surfaces 52 of the circular flex-lips 46 respectively thereof indicates that the circular flex-lips receive a heat treated hardening in that area to an extent, depending on the particular metal alloy material, sufficient for hardening the interface contact surfaces 52 against abrasion and corrosion but not to such an extent as to cause brittleness of the flex-lips 46 and thereby in turn cause possible mechanical problems in effecting compressive flex-fit closure of the valve plug 16 as previously described in detail.

Figure 6:
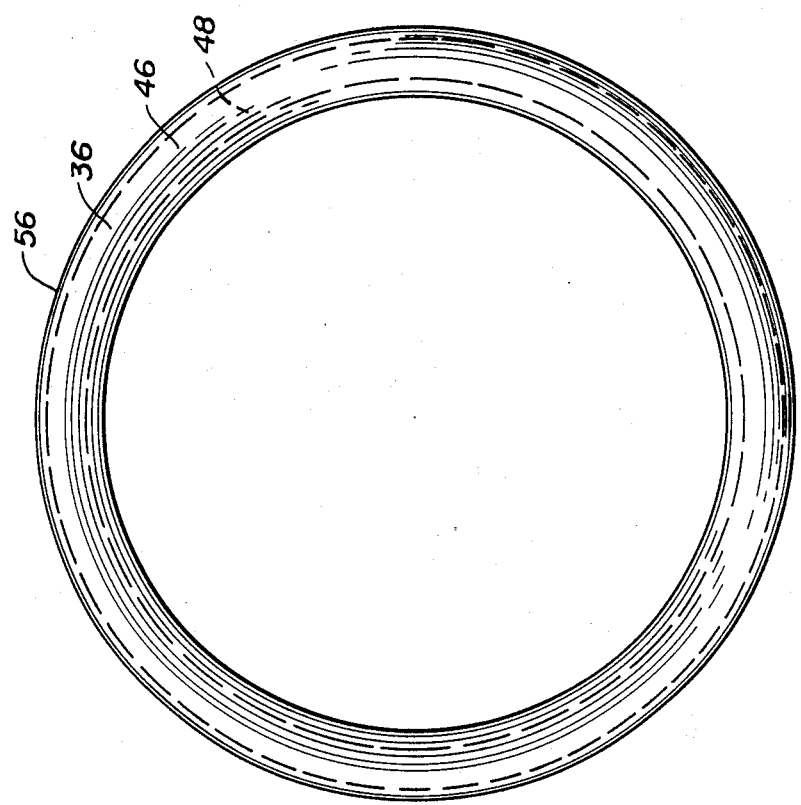
FIG. 6 is a top plan view of the alternate embodiment valve seat structure of instant invention.
Figure 5:
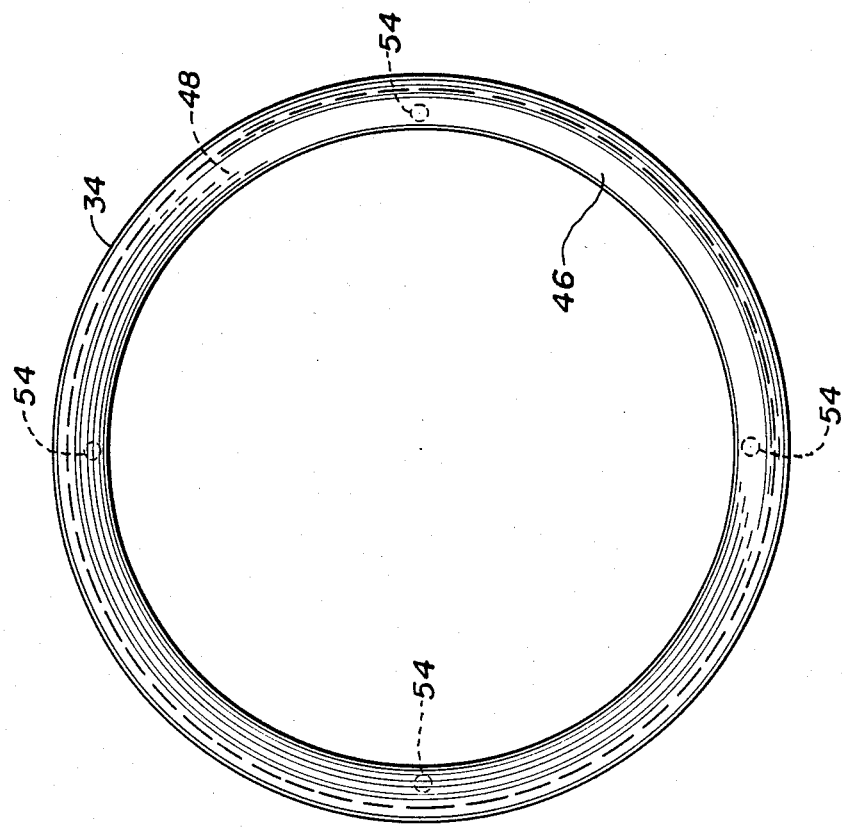
FIG. 5 is a top plan view of the preferred embodiment valve seat structure of instant invention.

The illustrations shown in FIGS. 5 and 6 are top plan views respectively of the preferred and alternate, internal and external circular flex-lip valve seat ring 34 and 36 structures, which are preferably fabricated by molding or machining from suitable metal alloy or other appropriate materials selected to withstand repeated cyclical flexures under high-pressure, high-temperature, corrosive environment use and operational conditions as previously described.

Figure 7:
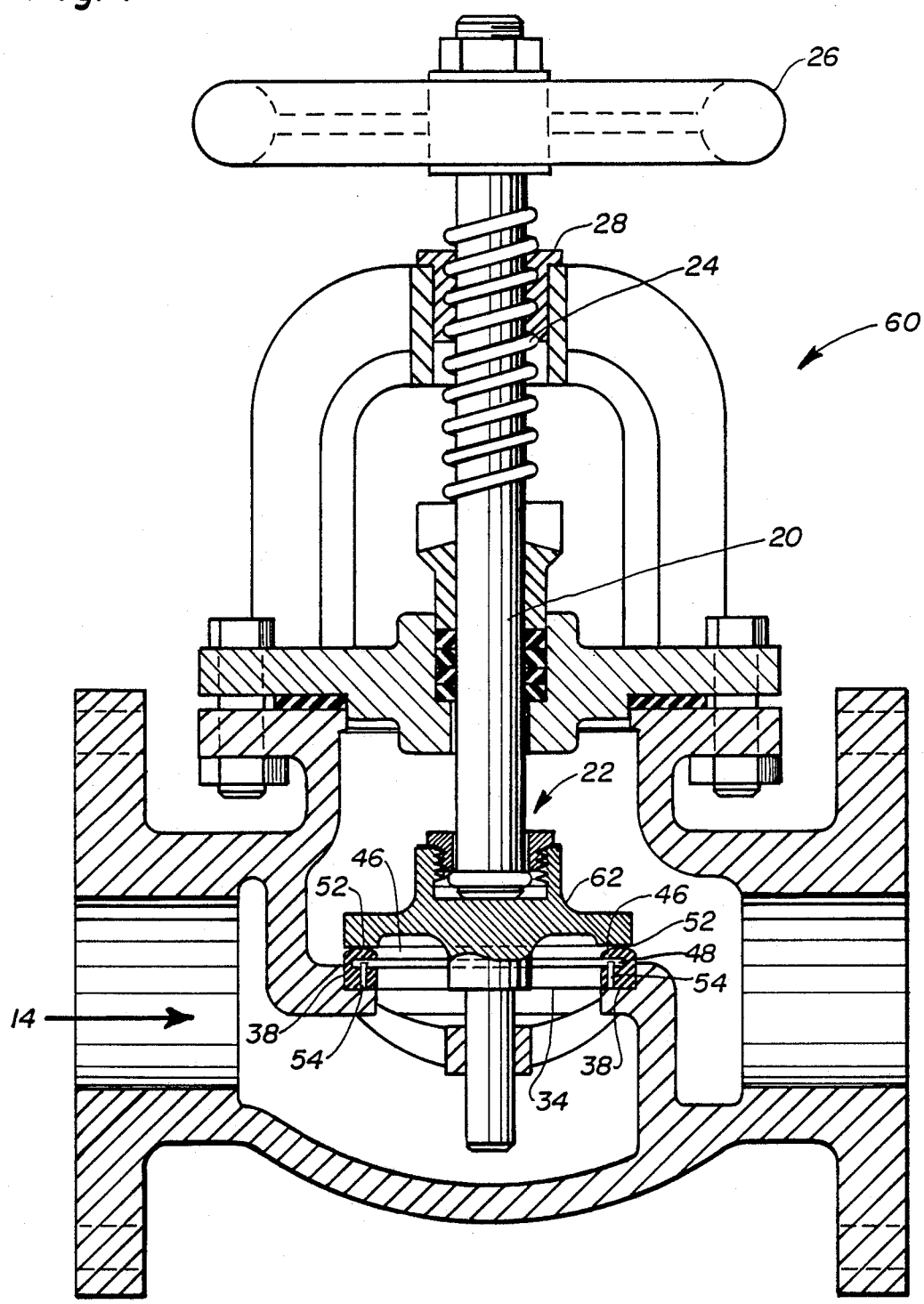
FIG. 7 is a vertical section through a typical globe valve showing the same modified with the valve seat structure and installed assembly of the preferred embodiment of the instant invention, wherein the valve plug thereof is shown in the closed position.

The illustration shown in FIG. 7 is similar to that shown in FIG. 1, but in this instance is that of a typical globe valve 60 in vertical section wherein the valve seat ring recess 38 has been conformed to receive and support therein an internal circular flex-lip valve seat ring 34, again with the high-pressure fluid flow direction arrow 14 indicating the high-pressure, or upstream, side. In this case, however, the globe valve closure 62 exerts a compressive flex-fit force perpendicularly to the circular flex-lip 46 over the interface contact surface 52 rather than at an inclined angle, or wedge configuration, as was the case with the gate valve 10 valve plug 16. Otherwise, the seating and sealing functions, and the reflexive hydraulic pressure counterforce within the flex-lip recess 48 and across the circular flex-lip 46, are the same as previously described.

Figure 8:
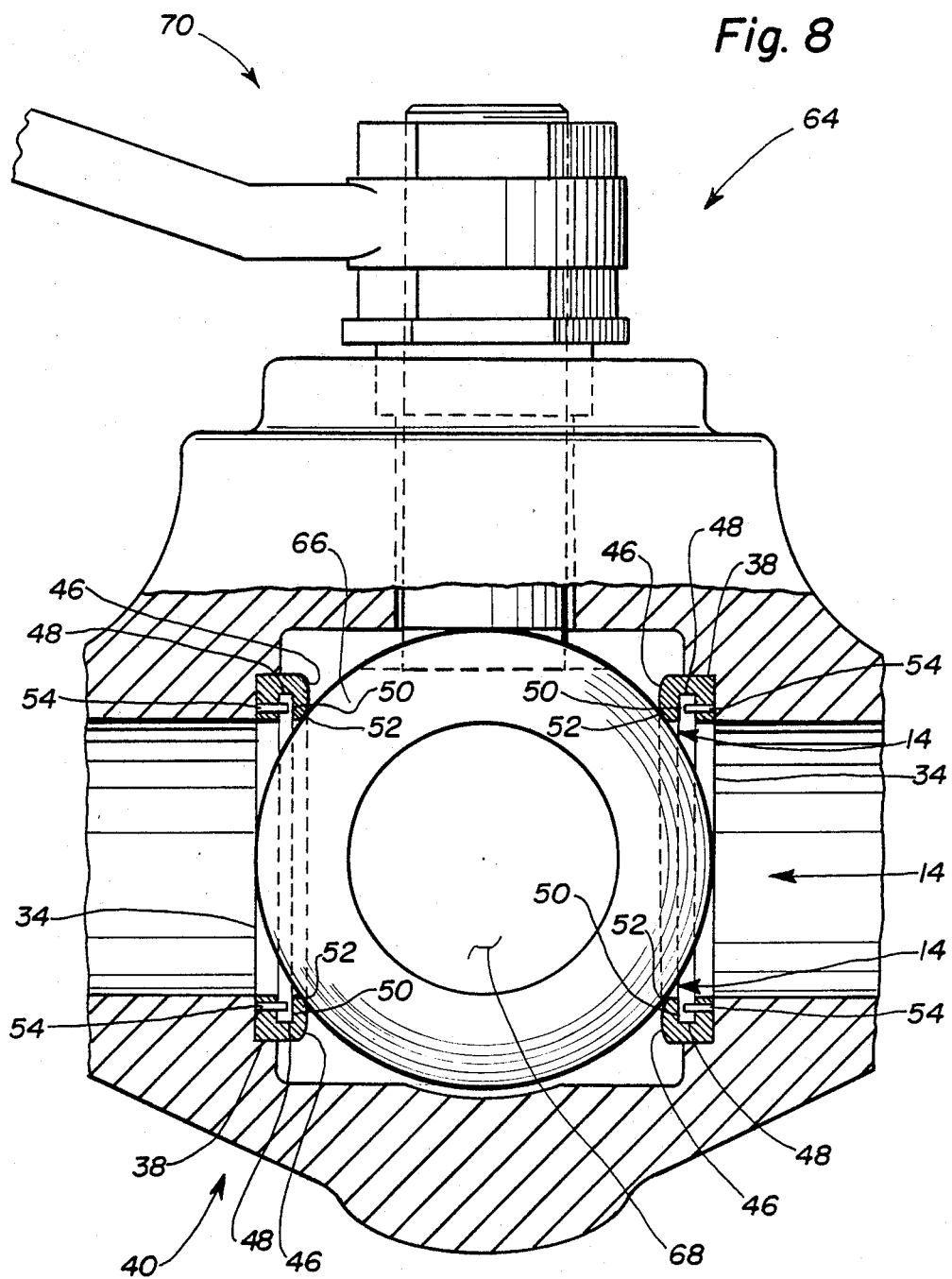
FIG. 8 is a cut-away side elevation view of a typical ball valve showing the same modified with the valve seat structure and installed assembly of the preferred embodiment of the instant invention, with the valve ball thereof being shown in the closed position.

Lastly, the illustration shown in FIG. 8 is similar to those previously shown in FIGS. 1 and 7, except in this case a typical ball valve 64 is shown in partial vertical section wherein the valve seat ring recesses 38 have been conformed to receive and support therein a set of the internal circular flex-lip valve seat rings 34, likewise again the high-pressure fluid flow direction arrow 14 indicating the high-pressure or upstream side. In this case, the ball valve closure 66, shown in the closed position with the ball valve port 68 thereof rotated by means of the mechanically communicating ball valve lever handle assembly 70 to be perpendicular to the high-pressure fluid flow direction 14, exerts a close-tolerance compressive force fit against the circular flex-lip 46 at the interface contact surface 52 therebetween to effect the initial closure seal. It is this initial mechanical closure seal across the flex-lip and ball valve closure mutual interface contact surface 52, as previously described, which is further enhanced as before by the action of a reflexive hydraulic counterforce effect of the high-pressure fluid 14 within the flex-lip recess 48 and against the internal circular flex-lip surface 50 as shown, thus to reflexively force the flex-lip 46 with a greater compressive valve closure seal across the mutual interface contact surface 52 with the ball valve closure 66 therebetween.

Although the valve seat assembly invention hereof, and the structural variants in both preferred and alternate embodiments thereof, respectively have been shown and described in what are conceived to be the most practical versions, it is recognized that departures may be made respectively therefrom within the scope of the invention, which is not to be limited per se to those specific details disclosed herein but is to be accorded the full scope of the claims so as to embrace any and all equivalent such devices, apparatus, and methods.

I claim:

1. A valve seat structure assembly adapted to be installed within and enhance the seat sealing capabilities of a high-pressure fluid control valve employed within a high-pressure fluid transmission line containing a high-pressure fluid, said valve seat structure assembly comprising in combination a valve seat ring having a recess disposed circumferentially about the interior periphery thereof to provide a circular flex-lip adapted to deflectively engage resiliently in cooperative compressive sealed communication upon a mutual interface contact surface with a valve closure of said high-pressure fluid control valve when the same is in the closed position, wherein said recess provides a means to utilize the contained transmission line high-pressure fluid as a reflexive hydraulic counterforce upon an internal circular flex-lip surface of said valve seat structure assembly to thereby provide said enhanced seat sealing capabilities by utilizing said reflexive hydraulic counterforce to effect an additional counterdeflective compression between said valve closure and said valve seat ring mutual interface contact surface, and a plurality of flex-limit stop posts radially disposed at regularly repeating circumferential displacements perpendicular to said internal circular flex-lip surface at a regularly repeating spaced distance therefrom.

2. The valve seat structure assembly according to claim 1 wherein said high-pressure fluid control valve is a gate valve.

3. The valve seat structure assembly according to claim 1 wherein said high-pressure fluid control valve is a globe valve.

4. The valve seat structure assembly according to claim 1 wherein said high-pressure fluid control valve is a ball valve.

5. A valve seat structure assembly adapted to be installed within and enhance the downstream seat sealing capabilities of a high-pressure fluid control valve employed within a high-pressure transmission line containing a high-pressure fluid, said valve seat structure assembly comprising in combination a valve seat ring having a recess disposed circumferentially about the exterior periphery thereof to provide an exterior circular flex-lip overhang adapted to deflectively engage resiliently in cooperative compressive sealed communication upon a mutual interface contact surface with a valve closure of said high-pressure fluid control valve when the same is in the closed position, wherein said recess provides a means to utilize the contained transmission line high-pressure fluid as a reflexive hydraulic counterforce upon an internal circular flex-lip surface of said valve seat structure assembly to thereby provide said enhanced seat sealing capabilities by utilizing said reflexive hydraulic counterforce to effect an additional counterdeflective compression between said valve closure and said valve seat ring mutual interface contact surface, and a means to prevent permanently deformable deflection of said circular flex-lip.

6. A valve seat structure assembly adapted to be installed within and enhance the downstream seat sealing capabilities of a high-pressure fluid control valve employed within a high-pressure transmission line containing a high-pressure fluid, said valve seat structure assembly comprising in combination a valve seat ring having a recess disposed circumferentially about the exterior periphery thereof to provide an exterior circular flex-lip overhang adapted to deflectively engage resiliently in cooperative compressive sealed communication upon a mutual interface contact surface with a valve closure of said high-pressure fluid control valve when the same is in the closed position, wherein said recess provides a means to utilize the contained transmission line high-pressure fluid as a reflexive hydraulic counterforce upon an internal circular flex-lip surface of said valve seat structure assembly to thereby provide said enhanced seat sealing capabilities by utilizing said reflexive hydraulic counterforce to effect an additional counterdeflective copression between said valve closure and said valve seat ring mutual interface contact surface, and a lip overhang support surface provided in the valve seat housing of said high-pressure fluid control valve being circumferentially disposed at a uniformly spaced distance from the circular flex-lip overhang.

* * * * *